US007031327B2

(12) United States Patent
Lu

(10) Patent No.: US 7,031,327 B2
(45) Date of Patent: Apr. 18, 2006

(54) NETWORK APPLICATION ASSOCIATION

(75) Inventor: Wei Lu, Coppell, TX (US)

(73) Assignee: Permeo Technologies, Inc., Irving, TX (US)

( * ) Notice: Subject to any disclaimer, the term of this patent is extended or adjusted under 35 U.S.C. 154(b) by 878 days.

(21) Appl. No.: 09/939,147

(22) Filed: Aug. 24, 2001

(65) Prior Publication Data

US 2003/0206523 A1 Nov. 6, 2003

(51) Int. Cl.
*H04L 12/28* (2006.01)
*H04L 12/56* (2006.01)
*G06F 15/16* (2006.01)

(52) U.S. Cl. ...................... 370/401; 709/245

(58) Field of Classification Search ............... 370/401, 370/463, 389, 395.31, 474–475, 392; 709/227, 709/238, 242, 245, 311
See application file for complete search history.

(56) References Cited

U.S. PATENT DOCUMENTS

| 6,148,336 A | 11/2000 | Thomas et al. |
| 6,157,965 A | 12/2000 | Mohammed et al. |
| 6,233,618 B1 | 5/2001 | Shannon |
| 6,243,379 B1 | 6/2001 | Veerina et al. |
| 6,397,255 B1 | 5/2002 | Nurenberg et al. |
| 6,608,830 B1 * | 8/2003 | Hirano et al. ............... 370/351 |
| 2002/0116502 A1 * | 8/2002 | Iyer et al. .................. 709/227 |

* cited by examiner

*Primary Examiner*—Chi Pham
*Assistant Examiner*—Ronald Abelson
(74) *Attorney, Agent, or Firm*—Haynes and Boone, LLP

(57) ABSTRACT

A method and system is disclosed for controlling packet communications between a first computer network and a second computer network. A driver module implemented in a first computer extracts information about an application session and a network address and port used by the first computer for sending packets of the application session to a second computer in the second computer network when the first computer initially determining a port for the application session. The driver module sends the extracted information to a gateway node of the first computer network, the gateway node being implemented with a server module and the gateway node monitoring one or more packets exchanging between the first and second computer networks. A look-up table is then established for recording the relation between the application and the network address and port used by the first computer for the application. The packet communications between the first and second networks are thus controlled by the gateway node based on the established look-up table.

22 Claims, 5 Drawing Sheets

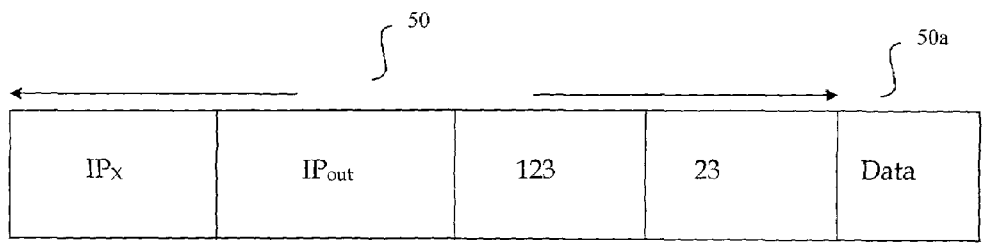
Fig. 6
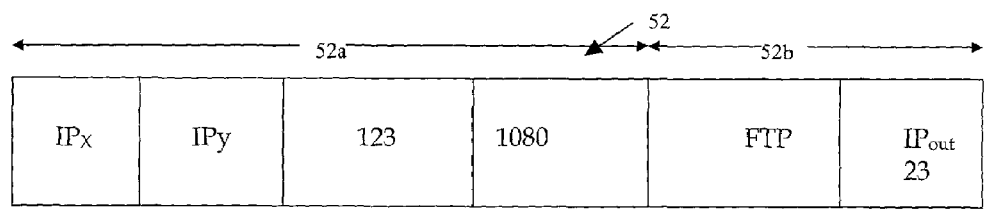
Fig. 7
| Initiating IP Address & Port | Destination Information | Application |
|---|---|---|
| $IP_1 : Port_1$ | $IP_{out} : Port_{out}$ | FTP |
| $IP_2 : Port_2$ | $IP_{out} : Port_{out}$ | FTP |
Fig. 8

NETWORK APPLICATION ASSOCIATION

BACKGROUND OF THE INVENTION

The present invention relates generally to computer network connections in a large scale network environment, and more particularly, to a system and method for providing addresses and ports for specific nodes in the computer network using a dynamic port management module.

There are many types of computer networks, including local area networks, wide area networks, and the Internet. Companies and organizations often use local or wide area networks as their private networks to link individual nodes (e.g., computers) for email communications, remote access, telephone calls, and internal data sharing. Depending on the sizes of the companies, these private networks can be very large. In order to maintain the integrity of the private networks, the computers therein are connected through a gateway to an outside network, such as the Internet, for additional communication purposes.

Often, each node of the private network will have a unique network address for the private network. The address, however, may not be of the type or format that is commonly used for the outside network (e.g., Internet Protocol (IP) address for the Internet), and therefore may not be used for communications with computers outside of the private network. In this situation, the gateway will have to assign a registered network address to the node of the private network that is communicating through the gateway with the outside networks. However, in the present art, the gateway only controls the mapping of unregistered network addresses with the registered addresses, and rarely does anything more.

Due to the complexity of the private networks and their various network applications, and for security reasons, it is important for the gateway to control which types of communications should be allowed between the private network and the outside network. For example, the gateway may wish to block a particular application initiated by any computer inside the private network. However, networking devices similar to the gateway, such as switches, routers, firewalls, VPNs, usually don't have the capability to acquire knowledge about addresses or ports used for applications that other networking devices need for communication purposes. To make it even more difficult for managing the control of the application, multiple application sessions can be initiated by multiple computers inside the private network. Although the gateway may provide IP addresses and port mapping, and when a fixed port is used for a well-known application, the gateway can block or otherwise control sessions of the application as long as they use the fixed port, in cases where a port is dynamically assigned for a particular application session, the gateway will lose such control, and leave the application session unregulated.

What is needed is a system and method for allowing the gateway to control packet communications and application sessions, including those that do not use a fixed, predetermined port.

SUMMARY OF THE INVENTION

A method and system is disclosed for controlling packet communications between a first computer network and a second computer network based on applications. In one example, a network application association (NAA) driver module implemented in a first computer extracts information about a network application session and a network address and/or port (address/port) used by the first computer. The extracted information is used to send packets to a second computer in the second computer network for the application session when the first computer initially determines a port for the application session. The NAA driver module sends the extracted information to a gateway node of the first computer network, the gateway node being implemented with a NAA server module. The gateway node can monitor one or more packets exchanging between the first and second computer networks. A look-up table is then established for recording the relation between the application and the network address/port used by the first computer for the application. The packet communications between the first and second networks are thus controlled by the gateway node based on the established look-up table.

In another example, the function of associating an application with the network address/port is integrated with a dynamic port management feature of the gateway. In this example, a driver module implemented in a first computer of the first computer network extracts information for identifying a network application session and a network address and a first port used by the first computer to send packets to a second computer in the second computer network for the application session. The driver module sends the extracted information to a gateway node of the first computer network, the gateway node being implemented with a server module and the gateway node dynamically assigning a second port for the application session. A look-up table is then established for recording the relation among the application session, the network address of the first computer, the first port, and the second port used for the application session by the first computer. The gateway node thus controls the packet communications between the first and second computers based on the established look-up table.

BRIEF DESCRIPTION OF THE DRAWINGS

FIG. 6 illustrates a portion of a packet used in an application session.

FIG. 7 illustrates a portion of a packet used for communications between the NAA driver and the NAA server of FIG. 5 according to one example of the present invention.

FIG. 8 illustrates a lookup table for associating the network addresses and ports with predetermined applications according one example of the present invention.

DESCRIPTION OF THE PREFERRED EMBODIMENT

The present invention provides a new and unique method for identifying and associating network addresses and ports with an application in a computer network environment. The disclosure below uses various embodiments to illustrate different features of the invention. These embodiments are intended as examples, and are not intended to limit the invention from that described in the claims.

Figure 1:
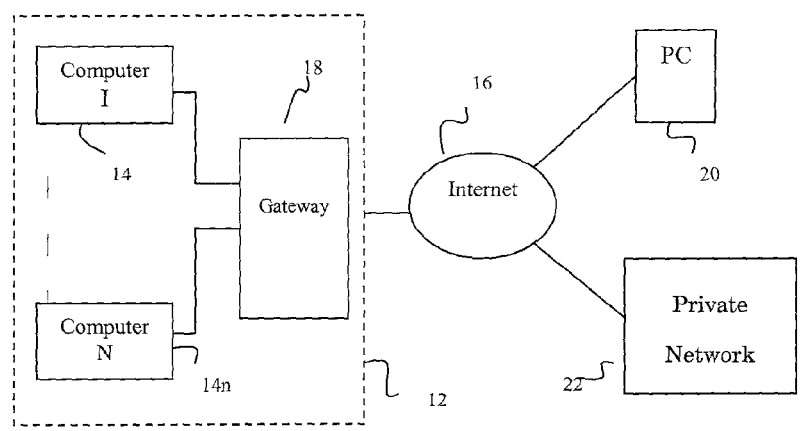
FIG. 1 illustrates a schematic of a network computing environment.

Referring now to FIG. 1, a network computing environment 10 includes a private network 12 having internally networked computers 14a–14n. The private network 12 is also connected to the Internet 16 via a gateway 18. In the present example, any computing node or computer 14a–14n inside the private network 12 can communicate with each other, or a computer connectable through the Internet 16 such as a computer 20 or a computer of another private network 22. In furtherance of the example, the information exchanged between any two computers is in the form of data packets and uses a mutually acceptable network protocol such as the Internet Protocol ("IP").

Figure 2:
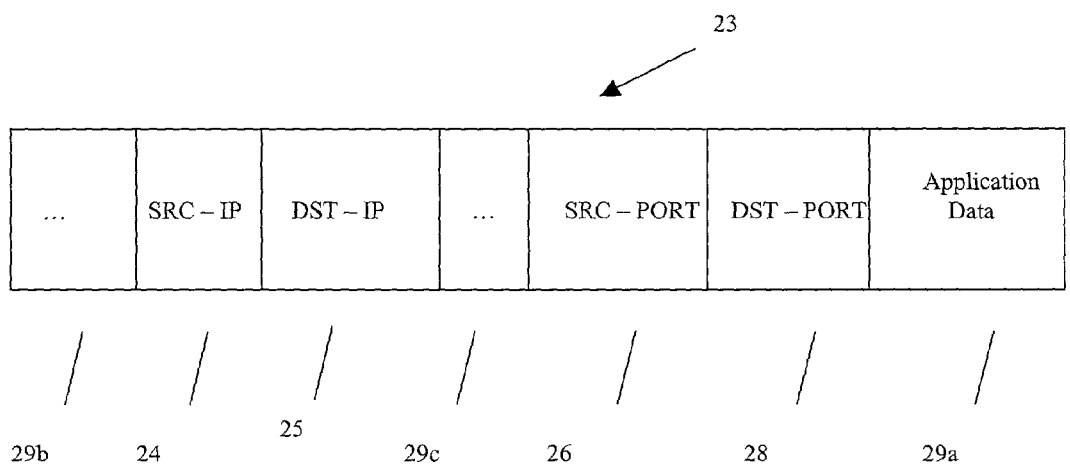
FIG. 2 illustrates a sample data packet.

Referring to FIG. 2, a sample data packet 23 includes header information about the source and destination computers in communication. A first section 24 indicates the IP address of the originating/source host/computer, and a second section 25 indicates the IP address of the destination host/computer. Sections 26 and 28 are identifiers for transport layers (e.g., TCP ports) such as a source port 26 and a destination port 28. The packet 23 also contains sections such as the data section 29a and various other sections (e.g., section 29b and 29c) that may not be directly relevant to the present invention. With the information contained in these sections of the data packet 23, the packet can be routed from network to network, and from computer to computer, with ease.

As of today, an IP address is defined by a 32-bit host address represented in dotted decimal notation (e.g. 10.234.34.4). Limited by its own definition of the 32-bit structure, only 4,294,967,296 unique IP addresses are available for the entire Internet, which far exceed the demands from all the computers connected or connectable to the Internet. Therefore, the private network 12 uses a limited number of IP addresses instead of assigning IP addresses for all the computers 14a–14n. The IP addresses for use with the Internet 16 are called "registered" network addresses, and all others for internal use inside of the private network 12 are known as "unregistered" network addresses. The use of unregistered network addresses inherently generates a conflicting problem for communications between two computers that do not belong to the same private network because all the computers in the private network 12 are not individually identified with their own registered IP addresses.

Consequently, in order for computers 14a–14n inside the private network 12 to access computers or servers outside, registered IP addresses must be used. Conventionally, the gateway 18 performs network address translation (NAT) or network address port translation (NAPT) to identify and distinguish the source and destination of the transmitted packet to/from the computers 14a–14n. In a more generic term, NAT refers to translations of network addresses and related fields in a packet to make it recognizable to a private network and a public network. NAPT is a specific case of NAT in which modifications are made to the packets in the segments/sections containing transport layer identifiers (e.g., TCP/UDP ports) and their related fields.

Viewing inside of the private network 12, each computer (e.g., 14a) is independently assigned an IP address which is only known to the private network (i.e., the unregistered IP address or the unregistered network address), therefore facilitating communications among the computers inside the private network. Assuming the private network 12 has a set of registered network addresses or registered IP addresses, there is a mapping mechanism available at the location of the gateway 18 to swap the unregistered IP address to one of the registered IP addresses.

For the sake of further example, it is assumed that a user on computer 14a initiates an FTP session with a server computer situated outside the private network 12. The computer 14a sends a packet that contains a source IP address of 10.5.5.5 and a destination IP address of 200.2.22.222. The destination IP address indicates that the destination is outside of the private network 12. Since the source IP address 10.5.5.5 is unknown outside of the private network, a return packet from the destination computer using the destination IP address 10.5.5.5 will not reach the computer 14a. Therefore, before the initial packet is sent out from the private network 12, the gateway 18 maps or translates the source IP address to one of the registered IP addresses (e.g., 188.88.8.88). This unique relationship between the unregistered IP address and the mapped registered address is stored in the gateway 18 for future use. With the recognizable IP address of 188.88.8.88, a return packet from the outside server will be delivered to the gateway 18, and the gateway would once again translate the destination IP address to 10.5.5.5 and forward the packet to computer 14a so that the original FTP session can continue.

Figure 3:
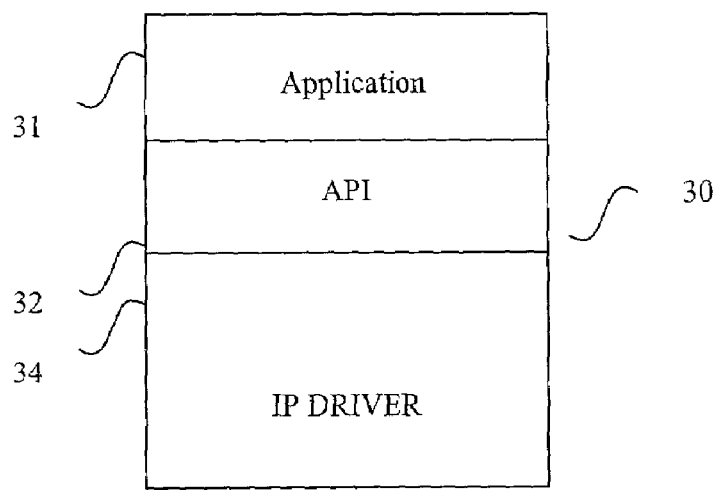
FIG. 3 illustrates a schematic showing computer architectural layers for an application, its API, and an IP driver.

Referring now to FIG. 3, for any particular application on a computer using IP addresses and port numbers (or ports in short), there are three architectural communication entities/layers as shown in block 30, the application 31, the specific application interface (API) 32, and the IP driver 34. When the application initiates a session, it asks the operating system (e.g., Socket) for a port number. The assigned port number, along with the IP address associated with the computer, is sent to the IP driver, which further furnishes each upcoming packet with the IP address and the assigned port number in its header portion.

Figure 4:
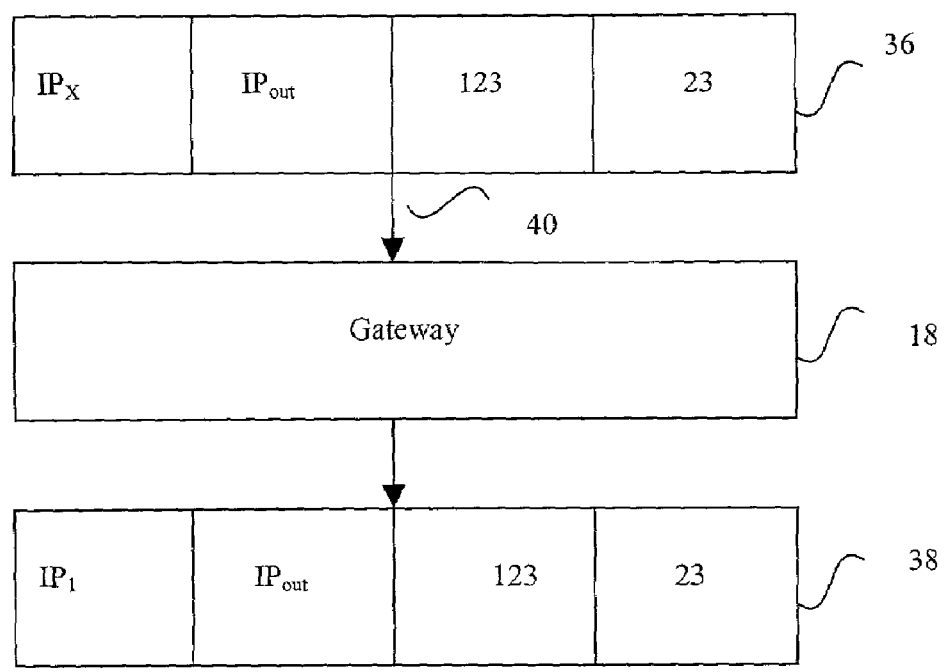
FIG. 4 illustrates a network address translation feature performed by a gateway module.

Referring to FIG. 4, conventionally, the gateway 18 uses the NAT feature to simply replace the source's unregistered address with a registered IP address. For example, if the computer in a private network, which bears an IP address of IPx, initiates an FTP session to an outside server having an IP address of $IP_{out}$ and a port number 23, the header portion of the packet will look like block 36. As it has been described with regard to FIG. 2, this header section of the packet indicates that the packet is from a computer having a source IP address of IPx and a source port of 123, and that the packet is intended to be routed to a computer with an IP address of $IP_{out}$ and port 23. When a conventional gateway or other NAT management module receives this packet, the source IP address of the packet is changed to a registered IP address, such as $IP_1$ as shown in block 38. The IP driver then sends the packet out.

A lookup table (not shown) is also created to indicate that the IP address-port pair IPx:123 has been changed to $IP_1$:123. Therefore, when a return packet is received by the gateway bearing the destination IP address of $IP_1$ and port 123, it can be routed correctly to IPx and port 123. It is noticed that in some situations the port number is not changed by the gateway. In such a case, for example, if the port 123 is used by an application session, then this port will not be available to other applications in the private network for a period of time. In some other situations, the port is changed if an NAPT is done, and an available port is dynamically chosen by the gateway for sending out the packet. Although the ability to dynamically choose a port gives a great benefit for managing the various ports available as it is illustrated above, it increases the level of difficulty for identifying the application.

Figure 5:
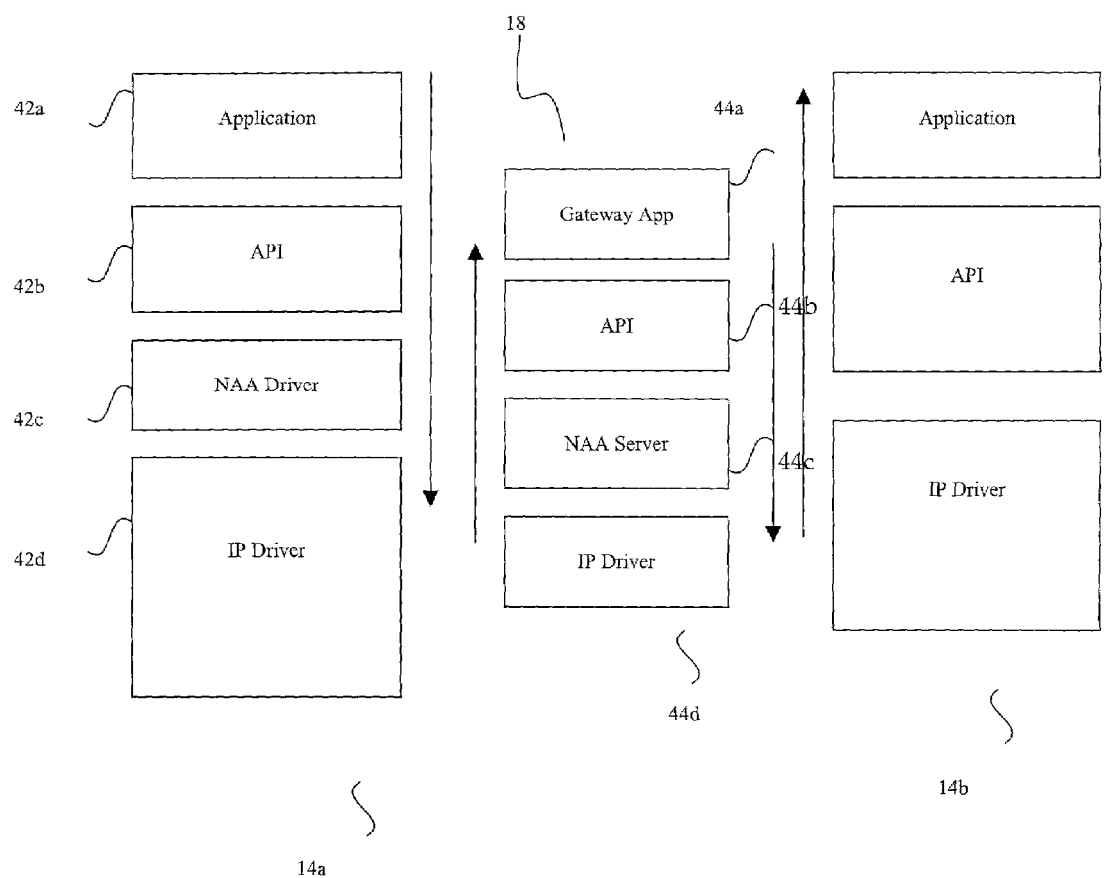
FIG. 5 illustrates a layer schematic for including a NAA server-driver pair for associating network addresses and ports with predetermined applications according to one example of the present invention.

Referring now to FIG. 5, the gateway 18 is integrated with a Network Application Association (NAA) server and is situated between an originating computer 14a and a destination computer 14b. The originating computer includes an application 42a and an NAA driver 42c. Although only one originating computer 14a is shown, it is assumed that a NAA driver is provided at each of the computers 14a–14n of the private network 12 (FIG. 1). According to one example of the present invention, the application 42a communicates with its API 42b, and then, communicates with the NAA driver 42c instead of communicating directly with an IP driver 42d. At the gateway 18, the same structure is formed for a gateway application 44a, its API 44b, the NAA server 44c, and the IP driver 44d for the gateway. The arrows shown in FIG. 5 are purely for illustration purposes indicating the directions for internal information flow through different layers at the originating computer 14a, the gateway 18, and the destination computer 14g. Compared to the example of FIG. 3, it is clear that the NAA server/driver layer "eavesdrops" and controls information exchanged between the API layer 32 and the IP driver 34, and thus builds intelligence into the communications among all three layers. With this structure, the IP address and port information can be identified and associated with a predetermined application not at the packet level, but done by using higher level communications between the NAA driver and the NAA server.

Continuing with the FTP session example discussed above, when the computer 14a initiates an FTP session, a communication is first made by the API 42b to the NAA driver 42c installed on the computer 14a, and then to the IP driver 42d. For illustration purposes, it is assumed that for the FTP session, the port number assigned is 123 and the IP address is IPx for the computer 14a. Also, the FTP server in the destination computer 20 bears the IP address of $IP_{out}$ and port 23. Referring to FIG. 6, a relevant header sections 50 of an outgoing data packet is shown to include information about $IP_x$:123 pair and $IP_{out}$:23 pair. A data section 50a follows the header 50 in the packet. The application layer 42a conveys this information to the IP driver 42d through its API 42b and the NAA driver 42c before any packet of the application is sent to the gateway. The NAA driver 42c communicates immediately with the NAA server 44c to inform the NAA server 44c that the upcoming packets using the IP address and port of $IP_x$:123 pair are associated with the FTP application related to $IP_{out}$:23 pair, which is directed to the outside FTP server 20.

This communication process between the NAA driver 42c and server 44c may use a plurality of packets communicated therebetween. Referring to FIG. 7, for instance, any given packet 52 for the communication initiated by the NAA driver to the NAA server will have a header section 52a. In these packets, the source IP address:port pair will still be IPx:123, however the destination IP address is now an unregistered IP address of the NAA server IPy, and the port is set to a predetermined one used by the gateway 18 such as a "well-known" port 1080. An indicator about the particular application, such as the FTP session in the immediate example, is embedded in the data section 52b of the packet, which may also include, in this case, the information about the final destination (e.g., the destination network address and port for computer 20). It is understood that since this application information is contained in the data section of the packet, not the header section, various methods can be implemented to have both the NAA driver and server agree on a predetermined mechanism for each of them to extract such information.

Referring to FIG. 8, a lookup table 60 can be constructed by the NAA server 44c at the gateway 18 from information exchanged between the NAA driver and server to provide network application association information between the application and various IP addresses and ports used by multiple computers in the private network. For example, as shown in the lookup table 60, two computers using $IP_1$: $Port_1$ and $IP_2$: $Port_2$ are all executing the FTP application. If the gateway 18 so wishes, it can control communication sessions for the FTP application in various manners. For instance, it can block all FTP application sessions regardless of which computer is the originating computer. It can also block an FTP application session if it is originated from a predetermined computer such as $IP_1$.

In another example of the present invention, if the IP address and the related port for the destination computer for a particular application are also sent to the NAA server from the NAA driver in the packets similar to the one shown in FIG. 7, the NAA server will have information about the destination computer for building the lookup table. Therefore, the lookup table 60 of FIG. 8 can include another column for such destination information. The gateway 18 can thereby control the application further with regards to the particular destination computer. For instance, the gateway 18 can block all FTP sessions with a particular destination computer, while leaving all other FTP sessions executed by other computers to flow freely through the gateway.

Figure 9:
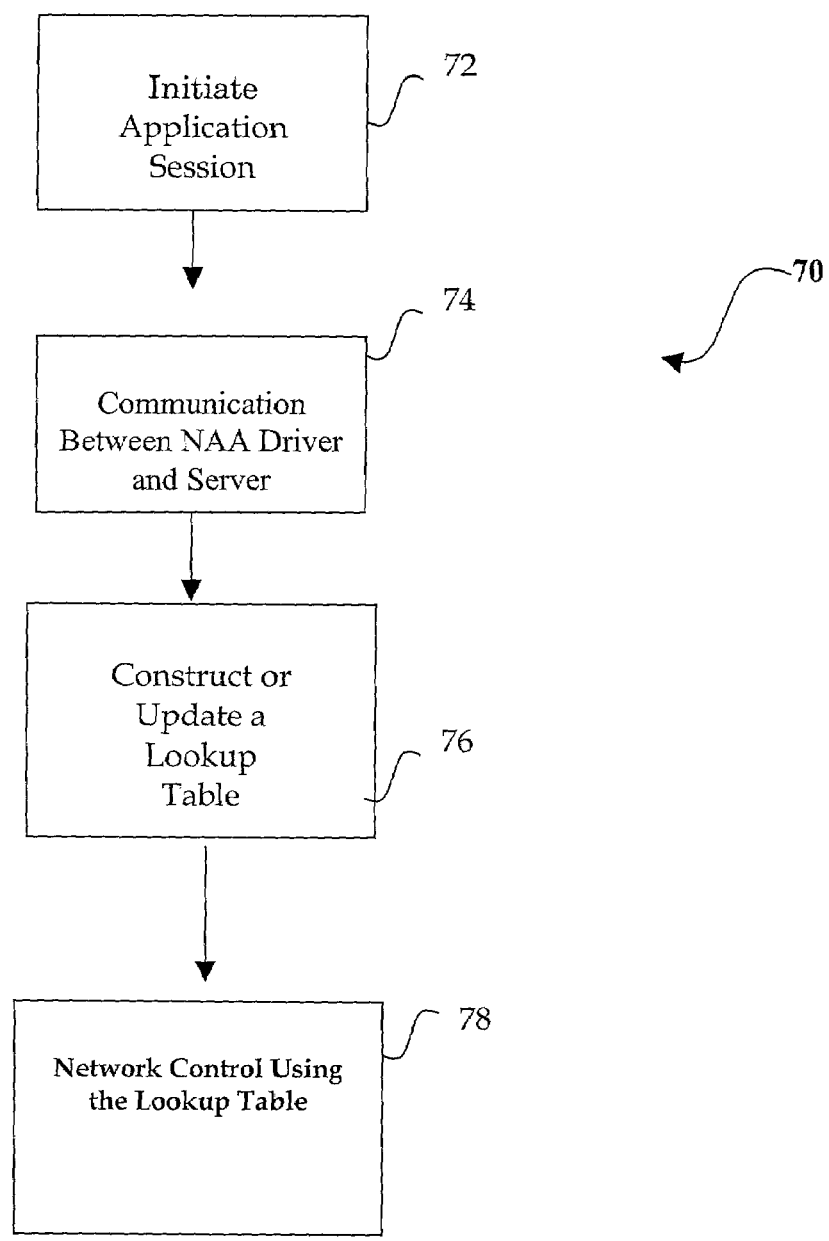
FIG. 9 illustrates a flow diagram showing a process for completing the network application association according to one example of the present invention.

Referring now to FIG. 9, a flow diagram 70 summarizes the steps taken by the NAA driver and NAA server for associating the IP address and port of a computer node with an application session according to one embodiment of the present invention. Before all the steps are taken, it is assumed that each computer or server is loaded with NAA driver software and the gateway 18 is equipped with NAA server software. Execution begins at step 72, where an application session (communication) is initiated from the NAA driver. At step 74, a communication process takes place between the NAA driver and NAA server to inform the NAA server about the application. In addition, the communication process provides the originating computer's IP address and its corresponding port, and if needed, the IP address and port for the destination computer. At step 76, the NAA server builds or updates a lookup table based on the received information. With the information of each application initiated by the computers inside the private network, at step 78, the gateway exerts intelligent control over any information exchanged between the private network and the outside network at the granularity of each application.

In the above-described examples, communications between the various computers are discussed. It is well known that a typical computer may include a central processing unit and memory for processing and storing data and programs. The computers may also include external interface devices, such as a modem or network card. It is understood that each of the computers and networks discussed above may be similarly configured, or may be very different. It is also understood that other network nodes, such as mobile nodes using mobileIP, can benefit from the present invention.

The present disclosure uses the NAA driver-server pair for intelligently identifying and associating IP addresses and ports with predetermined network applications executed by computer nodes in a network environment. It is understood that the private network is not necessarily limited to a physical location, and the gateway installed with the NAA server is not necessarily located at the same location as the private network. In today's web centric networking environment, a private network can easily exist in a virtual manner because all the computers/servers belonging to the private network can locate at different locations while still being connected to the gateway through the web, as long as the gateway can be identified at any moment.

To the extent that the gateway is connectable to and accessible by the individual computers, the gateway can still control the information flow based on specific applications. It is therefore also contemplated by the present invention that the function of the gateway can be centrally located and provided as an Application Service Provider. This can reduce the burden of each private network to have its gateway independently managed.

Another advantage of the present invention is that two different communication components can be used: the NAA driver and the NAA server, which add intelligence on packet processing. Moreover, both the NAA driver and server can work together in a symmetric mode of communication. That is, the driver and server work in both communication directions. Furthermore, the NAA driver and server allows the gateway to control communications between a private network and outside networks at the granularity of each computer application and each related computer.

While the invention has been particularly shown and described with reference to the preferred embodiment thereof, it will be understood by those skilled in the art that various changes in form and detail may be made therein without departing from the spirit and scope of the invention.

What is claimed is:

1. A method for controlling packet communications between a first network and a second network, the method comprising:
   implementing a server module in a connecting node, the connecting node for monitoring one or more packets exchanged between the first and second networks;
   implementing a driver module in a first node inside the first network; and
   associating, with the assistance of the server and driver modules, a network address and port used by the first node with a predetermined application, wherein the network address and port is used for sending at least one packet of the application to a second node in the second network.

2. The method of claim 1 further comprising: executing packet communications between the server module and the driver module to inform the connecting node about the network address and port used by the first node for the predetermined application before the first node sends a first packet of the application to the second node.

3. A method for controlling packet communications between a first network and a second network, the method comprising:
   implementing a server module in a connecting node, the connecting node for monitoring one or more packets exchanged between the first and second networks;
   implementing a driver module in a first node inside the first network;
   associating, with the assistance of the server and driver modules, a network address and port used by the first node with a predetermined application, wherein the network address and port is used for sending at least one packet of the application to a second node in the second network; and
   executing packet communications between the server module and the driver module to inform the connecting node about the network address and port used by the first node for the predetermined application before the first node sends a first packet of the application to the second node, wherein the network address and port used by the first node and information for identifying the predetermined application are included in a predetermined data portion of at least one packet exchanged between the server module and the driver module.

4. A method for controlling packet communications between a first network and a second network, the method comprising:
   implementing a server module in a connecting node, the connecting node for monitoring one or more packets exchanged between the first and second networks;
   implementing a driver module in a first node inside the first network; and
   associating, with the assistance of the server and driver modules, a network address and port used by the first node with a predetermined application, wherein the network address and port is used for sending at least one packet of the application to a second node in the second network wherein the driver module monitors information exchanged between an application interface (API) of the application and a network driver of the first node.

5. The method of claim 4 further comprising:
   the driver module extracting information regarding the application from the information exchanged between the API and the network driver; and
   sending the extracted information to the server module.

6. The method of claim 1 wherein the step of associating further comprises establishing a look-up table for recording a relation between the application and the network address and port used by the first node for the application.

7. The method of claim 6 wherein the look-up table further comprises a network address and port for the second node for executing the application.

8. A computer software system for controlling packet communications, based on applications, between a first computer network and a second computer network, the system comprising:
   a network application association (NAA) server module implemented in a gateway node, the gateway node monitoring one or more packets exchanged between the first and second computer networks;
   an NAA driver module implemented in a first computer inside the first computer network; and
   means for associating, with the assistance of the server module and the driver module, a network address and port used by the first computer with a predetermined application, the network address and port being used for sending at least one packet of the application to a second computer in the second network.

9. The system of claim 8 further comprising: means for executing packet communications between the NAA server module and the NAA driver module to inform the gateway node about the network address and port used by the first computer for the predetermined application before the first computer sends a first packet of the application to the second computer.

10. A computer software system for controlling packet communications, based on applications, between a first computer network and a second computer network, the system comprising:
    a network application association (NAA) server module implemented in a gateway node, the gateway node monitoring one or more packets exchanged between the first and second computer networks;

an NAA driver module implemented in a first computer inside the first computer network;

means for associating a network address and port used by the first computer with a predetermined application, the network address and port being used for sending at least one packet of the application to a second computer in the second network; and means for executing packet communications between the NAA server module and the NAA driver module to inform the gateway node about the network address and port used by the first computer for the predetermined application before the first computer sends a first packet of the application to the second computer, wherein the network address and port used by the first computer and information for identifying the predetermined application are included in a predetermined data portion of at least one packet exchanged between the NAA server module and the NAA driver module.

11. A computer software system for controlling packet communications, based on applications, between a first computer network and a second computer network, the system comprising:

a network application association (NAA) server module implemented in a gateway node, the gateway node monitoring one or more packets exchanged between the first and second computer networks;

an NAA driver module implemented in a first computer inside the first computer network; and means for associating a network address and port used by the first computer with a predetermined application, the network address and port being used for sending at least one packet of the application to a second computer in the second network, wherein the NAA driver module monitors information exchanged between an application interface (API) of the application and a network driver of the first computer.

12. The system of claim 11 wherein the NAA driver module includes means for extracting information regarding the application from the information exchanged between the API and the network driver, and means for sending the extracted information to the NAA server module.

13. The system of claim 8 wherein the means for associating further comprises a look-up table for recording a relation between the application and the network address and port used by the first computer for the application.

14. The system of claim 13 wherein the look-up table further comprises a network address and port for the second computer for executing the application.

15. A method for controlling packet communications between a first computer network and a second computer network, the method comprising:

extracting, by a network application association (NAA) driver module implemented in a first computer of the first computer network, information about an application session and a network address and port used by the first computer for sending packets of the application session to a second computer in the second computer network wherein the first computer initially determines a port for the application session;

sending the extracted information from the NAA driver module to an NAA server module implemented in a gateway node of the first computer network, the gateway node monitoring one or more packets exchanging between the first and second computer networks, wherein the network address and the port and information for identifying the application session are included in a predetermined data portion of at least one packet;

establishing a look-up table for recording the relation between the application session and the network address and port used by the first computer for the application session; and controlling the packet communications between the first and second network by the gateway node based on the established look-up table.

16. The method of claim 15 wherein the step of sending is completed before the first computer sends a first packet of the application session to the second computer.

17. A method for controlling packet communications between a first computer network and a second computer network, the method comprising:

extracting, by a network application association (NAA) driver module implemented in a first computer of the first computer network, information about an application session and a network address and port used by the first computer for sending packets of the application session to a second computer in the second computer network wherein the first computer initially determining a port for the application session;

sending the extracted information from the NAA driver module to an NAA server module implemented in a gateway node of the first computer network, the gateway node monitoring one or more packets exchanging between the first and second computer networks;

establishing a look-up table for recording the relation between the application session and the network address and port used by the first computer for the application session; and controlling the packet communications between the first and second network by the gateway node based on the established look-up table, wherein the NAA driver module monitors information exchanged between an application interface (API) of the application session and a network driver of the first computer.

18. The method of claim 15 wherein the look-up table further comprises a network address and port for the second computer for executing the application session.

19. A method for controlling packet communications between a first computer network and a second computer network based on applications, the method comprising:

extracting, by a driver module implemented in a first computer of the first computer network, information for identifying a network application session and a network address and a first port used by the first computer to send packets to a second computer in the second computer network for the application session;

sending the extracted information from the driver module to a server module implemented in a gateway node of the first computer network, the gateway node assigning a second port for the application session, wherein the network address and the port and information for identifying the application session are included in a predetermined data portion of at least one packet;

establishing a look-up table for recording the relation among the application session, the network address, the first port and the second port used for the application session by the first computer; and controlling the packet communications between the first and second computers by the gateway node based on the established look-up table.

20. The method of claim 19 wherein the step of sending is completed before the first computer sends a first packet of the application session to the second computer.

21. A method for controlling packet communications between a first computer network and a second computer network based on applications, the method comprising:
  extracting, by a driver module implemented in a first computer of the first computer network, information for identifying a network application session and a network address and a first port used by the first computer to send packets to a second computer in the second computer network for the application session;
  sending the extracted information from the driver module to a server module implemented in a gateway node of the first computer network, the gateway node assigning a second port for the application session;
  establishing a look-up table for recording the relation among the application session, the network address, the first port and the second port used for the application session by the first computer; and
  controlling the packet communications between the first and second computers by the gateway node based on the established look-up table, wherein the driver module monitors information exchanged between an application interface (API) of the application session and a network driver of the first computer.

22. The method of claim 19 wherein the look-up table further comprises a network address and port used by the second computer for the application session.

* * * * *